United States Patent
Castro Martinez et al.

(10) Patent No.: US 10,775,624 B2
(45) Date of Patent: Sep. 15, 2020

(54) BINOCULAR DEVICE COMPRISING A MONOCULAR DISPLAY DEVICE

(71) Applicant: Essilor International, Charenton-le-Pont (FR)

(72) Inventors: Luis Ricardo Castro Martinez, Charenton-le-Pont (FR); Konogan Baranton, Charenton-le-Pont (FR); Vincent Roptin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1 day.

(21) Appl. No.: 15/541,252

(22) PCT Filed: Dec. 30, 2015

(86) PCT No.: PCT/EP2015/081458
§ 371 (c)(1),
(2) Date: Jun. 30, 2017

(87) PCT Pub. No.: WO2016/107921
PCT Pub. Date: Jul. 7, 2016

(65) Prior Publication Data
US 2017/0371161 A1 Dec. 28, 2017

(30) Foreign Application Priority Data
Dec. 31, 2014 (EP) .................................. 14307229

(51) Int. Cl.
*G02B 27/01* (2006.01)
*G02C 7/10* (2006.01)
*G02B 5/30* (2006.01)

(52) U.S. Cl.
CPC ........... *G02B 27/0172* (2013.01); *G02B 5/30* (2013.01); *G02B 5/3025* (2013.01);
(Continued)

(58) Field of Classification Search
CPC ...... G02C 11/10; G02C 7/101; G02B 5/3025; G02B 27/0172
(Continued)

(56) References Cited

U.S. PATENT DOCUMENTS 6,307,526 B1   10/2001   Mann
8,467,133 B2 *  6/2013   Miller .................. G02B 27/017
                                                353/28

(Continued)

FOREIGN PATENT DOCUMENTS

EP   0716329 A1   6/1996
EP   0899599 A2   3/1999

(Continued)

OTHER PUBLICATIONS

Patent Cooperation Treaty, International Search Report and Written Opinion, PCT Appln. No. PCT/EP2015/081458, dated Mar. 31, 2016.

*Primary Examiner* — Calvin C Ma
(74) *Attorney, Agent, or Firm* — Oblon, McClelland, Maier & Neustadt, L.L.P.

(57) ABSTRACT

A binocular device adapted to a wearer comprising: a first lens and a second lens, respectively designed to be placed in front of first and second eyes of the wearer, the first lens comprising at least a back face, a monocular display device designed and arranged to display a virtual picture towards the first eye of the wearer, the virtual picture being transmitted through the back face of the first lens defining a display area on the back face, wherein: the second lens comprises an adapted area and a corresponding area, the corresponding area is the area scanned by the second eye of the wearer when the first eye scans the virtual picture through the display area, and the adapted area is arranged so that the adapted area overlaps at least a part of the corresponding area, and the adapted area is configured to be obscured.

20 Claims, 1 Drawing Sheet

(52) U.S. Cl.
CPC ........... G02B 27/017 (2013.01); G02C 7/104 (2013.01); *G02B 2027/014* (2013.01); *G02B 2027/0118* (2013.01); *G02B 2027/0132* (2013.01); *G02B 2027/0178* (2013.01); *G02B 2027/0187* (2013.01)

(58) Field of Classification Search
USPC .................... 345/7, 8, 672; 349/15; 348/151
See application file for complete search history.

(56) References Cited

U.S. PATENT DOCUMENTS

| | | | |
|---|---|---|---|
| 9,237,847 B2 * | 1/2016 | Wang | A61B 3/152 |
| 10,627,624 B2 * | 4/2020 | Pan | H04N 9/3173 |
| 2012/0127284 A1 * | 5/2012 | Bar-Zeev | G02B 27/017 |
| | | | 348/53 |
| 2013/0208014 A1 * | 8/2013 | Fleck | G06K 9/00684 |
| | | | 345/672 |
| 2015/0205126 A1 * | 7/2015 | Schowengerdt | G06T 13/40 |
| | | | 345/633 |
| 2016/0011417 A1 * | 1/2016 | Border | G02B 27/0172 |
| | | | 359/630 |

FOREIGN PATENT DOCUMENTS

| | | |
|---|---|---|
| EP | 1720058 A1 | 11/2006 |
| JP | 2008046562 A | 2/2008 |
| WO | 1996026415 A2 | 8/1996 |
| WO | 2005043224 A2 | 5/2005 |
| WO | 2012039877 A1 | 3/2012 |

* cited by examiner

BINOCULAR DEVICE COMPRISING A MONOCULAR DISPLAY DEVICE

The invention relates to a binocular device comprising a monocular display device adapted for providing a virtual picture towards an eye of a wearer.

Particularly, the invention relates to a binocular device adapted for providing both an ophthalmic vision and a supplementary vision (the virtual picture) to a wearer of this binocular device.

The ophthalmic vision is the usual or natural vision by the wearer of actual objects existing in his environment. The ophthalmic vision may be improved by using ametropia-correcting eyeglasses or solar eyeglasses, for example.

The supplementary vision is intended to provide the wearer with supplementary information, or extra information. This supplementary information may be data which are displayed for the wearer to see them. For example, piloting data may be displayed on the visor of a pilot helmet, so that these data appear superposed to the image of the ophthalmic vision. Another example of supplementary vision is to supply the wearer with modified images of parts of his environment. Such modified images may be magnified images of infrared images converted into visible light images. Another example of supplementary vision is to supply the wearer with an augmented reality image. The augmented reality image may relate to a real-world scene which represents an environment in which a user is located.

A monocular display device comprises a display element designed to be placed in front of a corresponding eye of a wearer and to display a virtual picture.

When the wearer uses a monocular display device for displaying a virtual picture to only one eye, there is a risk of fatigue or diplopia since one eye looks at the virtual picture and the other one looks at the real world. Indeed, these two pictures have differences of brightness, contrast, distance and displayed objects may be different, which makes difficult to view the information image.

Still monocular display device can be relevant compared to a binocular display device as it less complex, bulky, light, expensive . . . .

One solution to improve the monocular vision of the eye looking at the virtual picture is to entirely close the second eye. Such a method is used by children having a strabismus or in sport by archer or shooter.

Nevertheless, such solution drastically reduces the visual field of the wearer since it is then reduced to a single monocular field. Furthermore it's not comfortable for a wearer to keep one eye closed for a moment. Besides it can impart a strange attitude of the wearer.

Therefore, there is a need for providing a binocular device enabling information content to be viewed by only one eye while limiting visual fatigue and discomfort for the wearer of the binocular device.

Thus, one object of the present invention is to provide a binocular device comprising a monocular display device which increases the comfort of the wearer by limiting the risk of competition or rivalry between the ophthalmic vision and the supplementary vision while allowing the wearer to maintain a binocular field in real vision in order to keep his perception of the real environment.

To this end, the invention proposes a binocular device adapted to a wearer comprising:
  a first lens and a second lens, respectively designed to be placed in front of a first and a second eye of the wearer, the first lens comprising at least a back face, and
  a monocular display device designed and arranged to display a virtual picture towards the first eye of the wearer, the virtual picture being transmitted at least through the back face of the first lens defining a display area on the back face,
wherein:
  the second lens comprises an adapted area and a corresponding area,
  the corresponding area is the area scanned by the second eye of the wearer when the first eye scans the virtual picture through the display area,
  the adapted area is arranged so that the adapted area overlaps at least a part of the corresponding area, and is configured to be obscured, and
  the adapted area is arranged and/or configured based on at least a wearer related parameter and/or a display area related parameter.

Within the meaning of the invention, an optical element is transparent when said optical element is placed between an object and an eye of an observer, the object can be viewed without significant loss of contrast by the eye of the observer through the optical element. The object and the observer are each located at distance of the optical element. In other words, an image of the object is formed through the optical element with no significant loss of quality of visual perception for the observer, also called "the wearer" when the observer wears the optical element mounted in a spectacle frame.

In the frame of the present invention, "an obscured optical element" means that the image of an object formed through the optical element is indistinct or hidden from view of the wearer. For example, the obscuration is achieved by occultation of at least a part of the optical element. Occultation refers to limitation of the visual information entering in the eye, quantitatively, for example by light darkening/blocking and/or light reflecting/deflecting and/or by coloration and/or to alteration of visual information entering in the eye, qualitatively, for example by light defocusing and/or light scattering.

Advantageously, thanks to such system, the competition between the real vision and the supplementary vision is reduced or removed. Thus the comfort of the wearer is increased and the risk of fatigue or diplopia is strongly decreased. To this end, the invention allows at least partially degrading the optical function sensed by the second eye. Indeed, the invention proposes to remove or reduce or attenuate the field of view of the real scene of the second eye corresponding to the field of view of the virtual picture of the first eye. Here, the field of view of the real scene of the second eye is defined as the field of view scanned by the second eye of the wearer when the first eye of the wearer scans the virtual picture through the display area.

An attenuation of only a part of the field of view of the second eye allows keeping real-world information and environment natural perception. Moreover it allows maintaining an extensive binocular field.

The attenuation can be made by light darkening/blocking and/or light reflecting/deflecting and/or by coloration and/or to alteration of visual information entering in the eye, qualitatively, for example by light defocusing and/or light scattering.

In the frame of the invention, the intensity of this attenuation can be adjusted depending on the information contained in the virtual picture and real-world. For example, the intensity of attenuation of the real-world information may be different for a wearer looking at a movie in public transport relative to another wearer looking for an address in a displayed directory when walking in the street.

Of course, this attenuation function of the real world can also be applied to the first eye receiving the virtual picture in order to implement the contrast of the information forming the virtual picture.

According to further embodiments which can be considered alone or in combination:

- the adapted area is configured to be obscured by light darkening and/or by light defocusing and/or by light reflecting/deflecting and/or by light scattering and/or by light spectral filtering and/or by tinting and/or by light polarizing;
- the at least one wearer related parameter comprises the interpupillary distance and/or the vergence and/or the gazing direction of at least one of the wearer eyes when the binocular device is used by the wearer to look at the virtual picture and/or the pupil diameter of at least one of the wearer eyes when the binocular device is used by the wearer to look at the virtual picture, and/or information data on the character of the motor or sensory dominant eye and/or of the greatest acuity eye;
- the at least one display area related parameter comprises the position of the display area and/or angular extent of the display area and/or the projection distance of the virtual object;
- the adapted area is configured to be permanently obscured;
- the binocular device comprises an active light modulating device comprising an active light modulating component and a controller, the active light modulating component forming the adapted area and the controller being configured to control the active light modulating component when a virtual picture is transmitted through the display area;
- the active light modulating component comprises a refringent medium having an electrically variable obscuring between a first light obscuring state and a second light obscuring state, the first light obscuring state being substantially transparent for visible light and the second light obscuring state being substantially obscured for visible light and wherein the electrically variable obscuring is configured to be commanded by the controller at any state between the first light obscuring state and the second light obscuring state when a virtual picture is displayed in the display area;
- the controller is configured to be manually activated for controlling the active light modulating component;
- the controller is configured to be activated for controlling the active light modulating component according to a parameter of at least a part of the environment of the wearer;
- the binocular device comprises at least a tracking component adapted to determine the gazing direction of at least one of the eyes of the wearer and the controller is configured to control the active light modulating component according to the determined gazing direction;
- the light modulating component controller is configured to be activated when the background seen by the second eye when the first eye is looking at the virtual image is a non-uniform and/or bright background;
- the light modulating component controller is configured to be not activated when the first eye of the wearer doesn't look at the virtual image;
- the light modulating component controller is configured to be activated by the monocular display device;
- the binocular device further comprises a patch adapted to be disposed on one face of the second lens and forming the adapted area;
- the adapted area is configured to be obscured according to a vertical gradient;
- the adapted area is configured to be obscured according to a radial gradient;
- the adapted area extends horizontally on the second lens;
- the first lens and the second lens are adapted to the wearer's prescription;
- the size of the adapted area is substantially greater than 70% of the size of the corresponding area;
- the size of the adapted area is substantially smaller than 30% of the size of the surface of the second lens;
- the adapted area corresponds to a photochromic portion of the second lens wherein the adapted area is obscured under the action of UV light; and
- the first lens and second lens comprise selective optical filtering means configured to at least partially hide said display area and said adapted area from the view of an outside observer, while retaining see-through properties of wherein the first lens and second lens for the wearer's visual field;
- the display area is at least partially embedded in the first lens.

An advantage of the binocular device according to the invention resides in the non-predetermined feature of the adapted area. In so doing, the binocular device is adaptable to every wearer, to the morphology of the wearer's face without any measurements on the wearer nor any related setting or adaptation from the device provider. In another embodiment, the adapted area is arranged so that the adapted area is smaller than the corresponding area. This embodiment is advantageous because it enables the wearer to keep a wide field of view on its second eye.

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
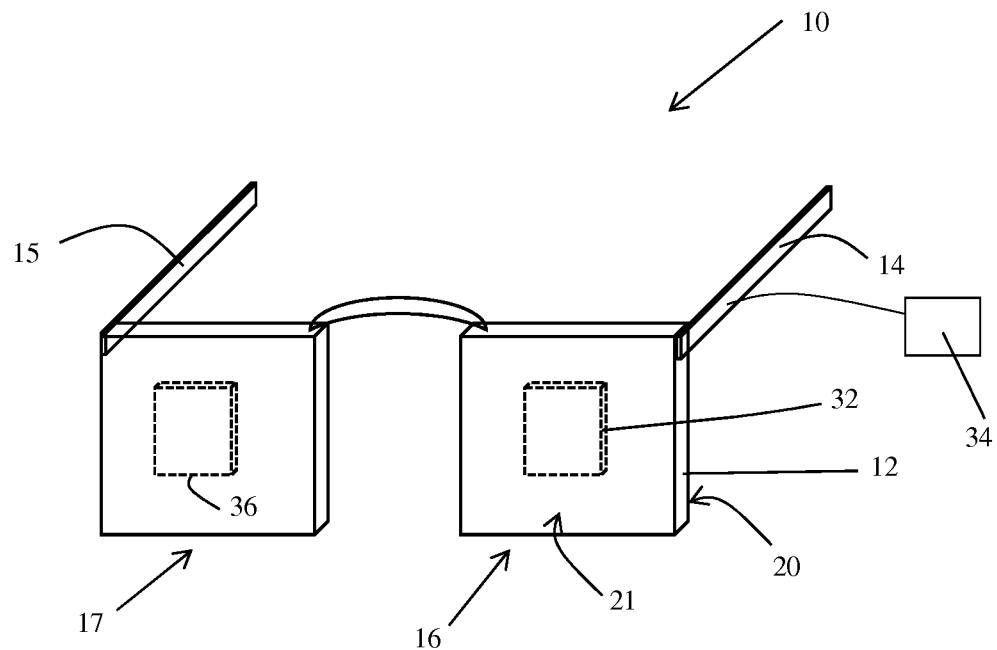
FIG. 1 represents a binocular device according to the invention.

FIG. 1 illustrates an example implementation of a binocular device 10 adapted to a wearer according to the invention. In this example, the frame is similar to a conventional eyeglasses frame and can be worn with a similar comfort level. However, other implementations are possible, such as a face shield which is mounted to the user's head by a helmet, strap or other means. The frame comprises a frame front 12 and temples 14 and 15.

The frame front 12 holds a first lens 16 and a second lens 17, respectively designed to be placed in front of a first and a second eyes of the wearer.

The first lens 16 comprises at least a back face 20 and a front face 21.

Advantageously, the first lens 16 and/or the second lens 17 can be adapted to the wearer's prescription, when the first and/or the second lenses 16, 17 are/is a see-through lens.

Figure 2:
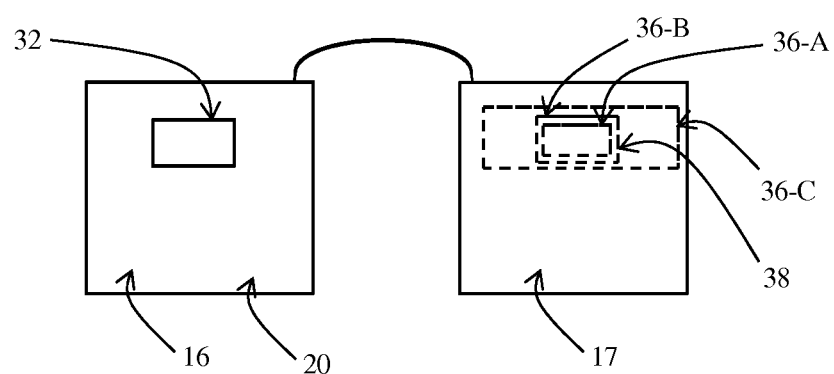
FIG. 2 illustrates the back faces of the lenses of the binocular device of FIG. 1.

Furthermore, the binocular device 10 comprises a monocular display device designed and arranged to display a virtual picture towards the first eye of the wearer. The virtual picture is transmitted at least through the back face 20 of the first lens 16 defining a display area 32 on the back face 20. FIG. 2 illustrates the back faces of the binocular device 10 according to the invention.

For example, the monocular display device is an eyeglass adapted for providing an ophthalmic vision and a supplementary vision to the wearer and arranged as described in US2012/0249899. To this purpose, the monocular display device comprises a light-conducting element (not illustrated on FIG. 1) preferably entirely embedded within the first lens 16 and dedicated to output the light of the supplementary vision or virtual picture. Furthermore, the monocular display device comprises a source unit 34 which is arranged and configured to produce the supplementary light so that this latter corresponds to a supplementary image or virtual picture after being output through an exit face of the light-conducting element and towards the first eye of the wearer. The monocular display device is arranged and configured so that in operation the source unit 34 can introduce the supplementary light into the light conducting element through an appropriate optical connection therebetween. The source unit 34 is embedded in the within the first lens 16. Other implementations are possible, where the source unit may be distant from the first lens.

In the example illustrates on FIG. 1, the monocular display device is partially embedded in the first lens 16. However, other implementations are possible, such as a monocular display device disposed in front of the first lens 16 (not represented). The expression "in front" is from the user's perspective, i.e. the first lens 16 is arranged between the monocular display device and the first eye of the wearer. In this case, the monocular display device comprises a light-conducting element distinct from the first lens. This light-conducting element can be a see-through lens or not. Other implementations are possible, where the monocular display device is totally embedded in the first lens 16.

Moreover, with reference to FIG. 2, the second lens 17 comprises an adapted area 36 and a corresponding area 38. The corresponding area 38 is defined as the area of the second lens scanned by the second eye 19 of the wearer when the first eye scans the virtual picture through the display area 32.

The adapted area 36 is arranged so that the adapted area 36 overlaps at least a part of the corresponding area 38. On FIG. 2, three sizes of an adapted area 36 are illustrated: one, noted 36-A, is smaller than the size of the corresponding area 38, one noted 36-B is equal to the size of the corresponding area 38 and one, noted 36-C is greater than the size of the corresponding area 38.

According to the invention, the adapted area 36 is configured to be obscured.

For example, the adapted area is configured to be obscured by light darkening and/or by light defocusing and/or by light reflecting/deflecting and/or by light scattering and/or by light spectral filtering and/or by tinting and/or by light polarizing.

For example, the adapted area corresponds to a photochromic portion of the second lens wherein the adapted area is obscured under the action of UV light.

For another example, the adapted area may be such that the transmitted light intensity in the adapted area is equal to the half of the light intensity of the virtual image.

For another example, the obscuring can be obtained by adding a spherical power, e.g. between 1 and 3 Diopters or a cylindrical power e.g. between 1 to 3 Diopters. Preferably, a positive spherical power is chosen to prevent the accommodation and ensure the blur.

Preferably, the size of the adapted area 36 is substantially greater than 70% of the size of the corresponding area 38 and substantially smaller than 30% of the size of the surface of the second lens 17. In other words, the size of the adapted area is sufficiently large to limit the risk of the competition between the ophthalmic vision and the supplementary vision and sufficiently small to maintain a binocular real field in order to keep his perception of the real environment.

Preferably, the adapted area extends horizontally on the second lens, according to the adapted area 36-C illustrated on FIG. 2.

Advantageously, the adapted area can be configured to be obscured according to a vertical gradient, wherein the attenuation due to the obscuration is greater at the top than at the obscuration at the bottom of the adapted area between a minimum and a maximum level of obscuration. The terms "top" and "bottom" are to be understood in the standard wearing conditions of the lenses.

According to a variant, the adapted area can be configured to be obscured according to a radial gradient defined by the geometrical center of the adapted area and wherein the attenuation due to the obscuration goes down with the radial distance from a maximum level of obscuration to a minimum level of obscuration.

The minimum level of obscuration on the adapted area should be greater or equal than 50% of the vision without obscuration.

As the display area usually has a rectangular contour shape, "radial obscuration" has to be understood as a continuous variation of obscuration according to lines crossing the geometrical center of the rectangular contour shape but not having mandatorily as whole a rotational symmetry.

Advantageously, the adapted area is arranged and/or configured based on at least a wearer related parameter.

For example, the wearer related parameters can be the standard fitting parameters, e.g. the interpupillary distance, the vertex distance, the mounting height and/or the vergence. Such parameters can be determined using an eye tracking system arranged and configured to image both eyes of the wearer, including the pupil. Indeed, the vergence may be also determined by comparing the gazing direction of both eyes of the wearer. According to another possibility, such parameters can be provided by a practitioner and/or a feature of the monocular display device.

For another example, the wearer related parameters can be the gazing direction of at least one of the wearer eyes when the binocular device is used by the wearer to look at the virtual picture (or when the first eye scans the virtual picture). Such parameters can also be determined using an eye tracking system. Indeed, the gazing direction of one eye may be used to determine the display area 32 and the corresponding area 38, i.e. the area scanned by the second eye 19 of the wearer when the first eye 18 scans the virtual picture through the display area 32.

The gazing direction of the second eye when the first eye is looking at the virtual image may not correspond mandatorily to the focalisation distance of the virtual picture. It is the reason why in an interesting embodiment, the binocular device according to the invention comprises an eye-tracker device for determining the gazing direction of this second eye.

For another example, the wearer related parameters can be the pupil diameter of at least one of the wearer eyes when the binocular device is used by the wearer to look at the virtual picture. The pupil diameter can also be determined using an eye tracking system. Indeed, the portion of light coming from virtual image when looking in border of display area can be assessed and taken into account for driving in the obscuration level. Pupil diameter should also be taken into account in blurring or non-isotropic scattering devices, for which an aperture has to be considered. Indeed, the size of the blur spot on the retina grows linearly with the pupil diameter, as the blur level with aperture in a camera.

For another example, the wearer related parameters can be information data on the character of the dominant eye and/or of the greatest acuity eye.

In the frame of the present invention, the wording "dominant eye" is used to designate a sensory dominance with binocular rivalry test as dichoptic, or a motor dominance with alignment test as hole in the card and the wording "greatest acuity eye" refers to the eye with best visual acuity at near or far distance Furthermore, the adapted area is preferably arranged and/or configured based on at least a display area related parameter. The display area can be determined thanks to or provided by the monocular display device.

For example, the display area related parameter can be the position of the display area and/or angular extent of the display area.

For another example compatible with the previous ones, the display area related parameter may be the projection distance of the virtual object as detailed hereinafter.

According to a first embodiment of the binocular device of the invention the adapted area is configured to be permanently obscured.

For example, a patch (opaque to visible light, or attenuating partially the visible light intensity) can be arranged permanently on one face of the second lens in order to form the adapted area.

According to a second embodiment of the binocular device of the invention the adapted area is configured to be temporarily obscured.

For another example, a patch (opaque to visible light, or attenuating partially the visible light intensity) can be arranged temporarily on one face of the second lens on one face of the second lens in order to form the adapted area. The patch is arranged manually when the monocular display device is in operation, i.e. when a virtual image is transmitted through the display area.

According to a third embodiment of the binocular device of the invention, the binocular device comprises an active light modulating device comprising an active light modulating component and a controller. The active light modulating component forms the adapted area and the controller is configured to control the active light modulating component such that the adapted area is configured not to be obscured at least if none virtual picture is transmitted through the display area or if the first eye of the wearer is not looking at the virtual picture.

For example, the binocular device can further comprise an active patch adapted to be disposed on one face of the second lens and forming the adapted area. In this case, the active light component can be embedded into such an active patch.

For example, the active light modulating component may comprise a refringent medium having an electrically variable obscuring between a first light obscuring state and a second light obscuring state. The first light obscuring state is substantially transparent for visible light and the second light obscuring state is substantially obscured for visible light. The electrically variable obscuring is configured to be commanded by the controller at any state between the second light obscuring state and the first light obscuring state at least if none virtual picture is displayed in the display area.

According to a sub-embodiment, the controller can be configured to be manually activated for controlling the active light modulating component, for example by a button pushed by the wearer or by other activating means as a tactile slider inserted in the temple of the frame when he uses the monocular display device. Thus, the adapted area is configured not to be obscured at least if none virtual picture is transmitted through the display area. The adapted area is obscured by the will of the wearer.

According to a variant of previous sub-embodiment, the controller is configured to be automatically activated for controlling the active light modulating component.

Preferably, the controller can be automatically activated according to wearer related parameters as described hereinbefore. In this case, the wearer related parameters are provided in order to be used to control the controller of the active light modulating component.

Advantageously, the controller can further be automatically activated according to a parameter of at least a part of the environment of the wearer. The parameter of at least a part of the environment of the wearer may be the brightness or the texturing of the part of the environment of the wearer localized in the gazing direction of the second eye when the first eye is looking at the virtual picture, and particularly when the value of this parameter is such that it increases the saillance of this part of the environment seen by the second eye in the corresponding field of view relatively to the virtual picture. Obscuring the adapted area promotes the virtual picture in the binocular rivalry. In the frame of the invention, the texturing is a homogenous visual characteristic repeated over an area as on canvas, gravel, metal curtain. It can be quantified with a 2D Fourier spatial analysis.

Indeed, according to the projection distance of the monocular display device, if the virtual image is displayed from a direction where stands, from the second eye, an uniform and/or dark element in the environment of the wearer, it promotes the virtual picture in the binocular rivalry: in this situation the adapted area does not need to be obscured. This allows the wearer maintaining an extensive binocular field of view when necessary.

More precisely, if the real vision forms a uniform and/or dark background for the virtual image, it is not necessary for the adapted area to be obscured. Here, the term "real vision" is to be understood as the real vision in the gazing direction of the second eye when the wearer is looking at the virtual image. Indeed, the background seen by the second eye can be very different from the background seen by the first eye. On the contrary, if the real vision forms a bright and/or uneven/textured background, it is necessary for the adapted area to be obscured.

To this end, the binocular device preferably comprises at least an eye tracking system component adapted to determine the gazing direction of at least one of the eyes of the wearer and the controller is configured to control the active light modulating component according to the determined gazing direction. Preferably, the eye tracking system component is adapted to determine the gazing direction of at least the first eye in order to determine if the first eye of the wearer is currently looking at the virtual image or not. If it is not the case, it may be not necessary for the adapted area to be obscured.

Moreover, the binocular device preferably comprises a system configured to determine the parameter of at least a part of the environment of the wearer, for example the brightness and/or the texturing of the part of the environment of the wearer.

For example, the system may comprise a camera arranged to image the scene disposed in front of the wearer and a system adapted to determine the "real" background seen by the second eye as defined hereinbefore.

For instance, an ambient light sensor can be embedded in the frame and linked to the controller. If the brightness of the environment measured by this sensor is greater than a minimum value, the adapted area will be obscured accordingly. Thus the adapted area won't be obscured in a dark environment but will be in other situation with a higher brightness.

For instance, a real gravel texture can scramble a virtual image of a face as in pointillism painting. Adding scattering with a polymer dispersed liquid crystal devices will reduce high spatial frequencies and enhance the perception of the virtual face.

Furthermore, the light modulating component controller can be configured to be activated when a virtual picture displayed in the display area comprises a uniform and bright background.

Moreover, the light modulating component controller can be configured to be activated by the monocular display device.

Another object of the invention relates to a method for controlling a binocular device adapted to a wearer as described hereinbefore, and particularly comprising a monocular display device designed and arranged to display a virtual picture towards the first eye of the wearer. The method comprises:

a step for displaying a virtual image picture towards the first eye of the wearer, an obscuring step, during which the adapted area on the second lens is obscured.

The obscuring step can be manually implemented by the wearer when a virtual picture is transmitted through the display area.

The obscuring step can be manually implemented by the wearer when the first eye scans the virtual picture through the display area.

According to another embodiment, the obscuring step can be implemented such that the adapted area is not obscured at least if none virtual picture is transmitted through the display area or if the first eye of the wearer is not looking at the virtual picture.

In this case, the method can further comprise a step for providing at least a wearer related parameter and/or a display area related parameter. Thus, the adapted area is arranged and/or configured based on at least the provided wearer related parameters and/or the provided display area related parameters. Thus, the provided wearer related parameters may be used to arrange the adapted area on the second lens and to control the obscuration of the adapted area.

Thus, the method can comprise a step for determining the provided wearer related parameters and/or the provided display area related parameters.

According to an embodiment as described hereinbefore wherein the binocular device comprises an active light modulating device comprising an active light modulating component and a controller, the controller can be configured to be activated for controlling the active light modulating component according to a parameter of at least a part of the environment of the wearer, for example the brightness or the texturing of the part of the environment of the wearer localized in the gazing direction of the second eye when the first eye looks at the virtual picture. In this case, the method should comprise a step for determining such parameter of at least a part of the environment of the wearer.

Another object of the invention relates to a computer program product comprising one or more stored sequences of instructions that are accessible to an adapted area controller embedded in the binocular device according to the invention, and which, when executed by the adapted area controller, causes the adapted area controller to control the adapted area of the binocular device according to the previous method.

The first lens and second lens may comprise selective optical filtering means configured to at least partially hide said display area and said adapted area from the view of an outside observer, while retaining see-through properties of wherein the first lens and second lens for the wearer's visual field.

The reflection coating can be in the form of a flash mirror, for example a neutral and transparent flash mirror. In some embodiments, this can be achieved by providing a stacking of $SiO_2$ and $ZrO_2$ layers. Examples are disclosed in U.S. Pat. No. 8,534,833. The skilled person can provide such stacking (multilayered coating). The number and alternation of layers can be modified as is known in the art, for instance: $SiO_2$ 80 nm-$ZrO_2$ 52 nm-$SiO_2$ 21 nm. Indices are as follows $SiO_2$ 1.48-$ZrO_2$ 2.00. A flash mirror can be prepared using a vacuum evaporation device, e.g. of the type BAK 760 retrofit Physimeca.

The invention further relates to a computer readable medium carrying one or more sequences of instructions of the computer program product according to the invention.

The invention claimed is:

1. A binocular device adapted to a wearer comprising:
   first lens and a second lens, respectively designed to be placed in front of a first and a second eyes of the wearer, the first lens including at least a back face; and
   a monocular display device designed and arranged to only display a virtual picture towards the first eye of the wearer, the virtual picture being transmitted at least through the back face of the first lens defining a display area on the back face,
   wherein: the second lens comprises an adapted area and a corresponding area, the corresponding area is a first physical area of the second lens scanned by the second eye of the wearer when the first eye scans the virtual picture through the display area, the adapted area is a second physical area of the second lens and is arranged so that the adapted area overlaps at least a part of the corresponding area, and the adapted area is configured to be obscured; and
   the adapted area is at least one of arranged and configured based on at least one of a wearer related parameter and a display area related parameter.

2. The binocular device according to claim 1, wherein the adapted area is arranged so that the adapted area is smaller than the corresponding area.

3. The binocular device according to claim 1, wherein the adapted area is configured to be obscured by at least one of light darkening, light defocusing, and/or by light reflecting, light deflecting, or by light scattering, light spectral filtering, tinting, and light polarizing.

4. The binocular device according to claim 1, wherein the at least one of the wearer related parameter comprises at least one of any standard fitting parameters, vergence, and a gazing direction of at least one of the eyes of the wearer when the binocular device is used by the wearer to look at at least one of the virtual picture and the pupil diameter of at least one of the eyes of the wearer when the binocular device is used by the wearer to look at at least one of the virtual picture, information data on a character of the dominant eye, and a character of a greatest acuity eye.

5. The binocular device according to claim 1, wherein at least one display area related parameter comprises at least one of a position of the display area, an angular extent of the display area, and a projection distance of a virtual object.

6. The binocular device according to claim 1, wherein the adapted area is configured to be permanently obscured.

7. The binocular device according to claim 1, wherein the binocular device comprises an active light modulating device comprising an active light modulating component and a controller, the active light modulating component forming the adapted area and the controller being configured to control the active light modulating component such that the adapted area is not obscured at least if no virtual picture is transmitted through the display area or if the first eye of the wearer is not looking at the virtual picture.

8. The binocular device according to claim 7, wherein the controller is configured to be manually activated for controlling the active light modulating component.

9. The binocular device according to claim 7, wherein the controller is configured to be activated for controlling the active light modulating component according to a parameter of at least a part of the environment of the wearer.

10. The binocular device according to claim 7, wherein the binocular device comprises at least a tracking component adapted to determine a gazing direction of at least one of the first and second eyes of the wearer and the controller is configured to control the active light modulating component according to the determined gazing direction.

11. The binocular device according to claim 1, wherein the adapted area is configured to be obscured according to a vertical gradient at least when a virtual picture is transmitted through the display area.

12. The binocular device according to claim 1, wherein the adapted area extends horizontally on the second lens.

13. The binocular device according to claim 1, wherein the first lens and the second lens are adapted to the wearer's prescription.

14. The binocular device according to claim 1, wherein the adapted area corresponds to a photochromic portion of the second lens wherein the adapted area is obscured under the action of UV light.

15. The binocular device according to claim 1, wherein the first lens and second lens comprise selective optical filtering means configured to at least partially hide said display area and said adapted area from a view of an outside observer, while retaining see-through properties of wherein the first lens and second lens for the wearer's visual field.

16. A method to adapt a binocular device to a wearer comprising:
   placing a first lens and a second lens in front of a first and a second eyes of the wearer, the first lens including at least a back face; and
   arranging a monocular display device designed and arranged to only display a virtual picture towards the first eye of the wearer, the virtual picture being transmitted at least through the back face of the first lens defining a display area on the back face,
   wherein the second lens comprises an adapted area and a corresponding area, the corresponding area is a first physical area of the second lens scanned by the second eye of the wearer when the first eye scans the virtual picture through the display area, the adapted area is a second physical area of the second lens and is arranged so that the adapted area overlaps at least a part of the corresponding area, and the adapted area is configured to be obscured.

17. The method to adapt the binocular device to the wearer of claim 16, further comprising manually activating for controlling the active light modulating component.

18. The method to adapt the binocular device of claim 16, further comprising activating for controlling the active light modulating component according to a parameter of at least a part of the environment of the wearer.

19. The binocular device according to claim 16, wherein the binocular device further comprising determining a gazing direction of at least one of the first and second eyes of the wearer and controlling the active light modulating component according to the determined gazing direction.

20. The binocular device according to claim 16, wherein the binocular device further comprises obscuring according to a vertical gradient at least when the virtual picture is transmitted through the display area.

* * * * *